United States Patent
Duda et al.

(10) Patent No.: US 7,194,045 B2
(45) Date of Patent: Mar. 20, 2007

(54) METHOD FOR DETERMINING A REFERENCE CLOCK PHASE FROM BAND-LIMITED DIGITAL DATA STREAMS

(75) Inventors: Thomas Duda, Duisburg (DE); Torsten Hinz, Neuss (DE); Martin Renner, Mettmann (DE)

(73) Assignee: Infineon Technologies AG, Munich (DE)

( * ) Notice: Subject to any disclaimer, the term of this patent is extended or adjusted under 35 U.S.C. 154(b) by 588 days.

(21) Appl. No.: 10/477,137

(22) PCT Filed: May 8, 2002

(86) PCT No.: PCT/EP02/05105

§ 371 (c)(1),
(2), (4) Date: Nov. 7, 2003

(87) PCT Pub. No.: WO02/091661

PCT Pub. Date: Nov. 14, 2002

(65) Prior Publication Data

US 2004/0151260 A1 Aug. 5, 2004

(30) Foreign Application Priority Data

May 10, 2001 (DE) ................. 101 22 621

(51) Int. Cl.
*H04L 27/00* (2006.01)
*H04L 7/00* (2006.01)
(52) U.S. Cl. ..................... 375/326; 375/355
(58) Field of Classification Search ............. 375/355, 375/326, 327, 371, 359, 360, 330, 344, 373, 375/354

See application file for complete search history.

(56) References Cited

U.S. PATENT DOCUMENTS

| 4,700,357 | A | * | 10/1987 | Ast | 375/214 |
| 5,537,442 | A | * | 7/1996 | Nakamura et al. | 375/330 |
| 5,654,987 | A | * | 8/1997 | Nakamura | 375/355 |
| 6,079,045 | A | * | 6/2000 | Van Den Enden | 714/780 |
| 6,377,642 | B1 | * | 4/2002 | Dollard | 375/355 |
| 2002/0009167 | A1 | * | 1/2002 | Farjad-Rad | 375/355 |

FOREIGN PATENT DOCUMENTS

| DE | 34 42 613 | 5/1986 |
| DE | 689 08 579 | 8/1993 |
| DE | 689 20 692 | 1/1995 |
| DE | 692 24 872 | 3/1998 |
| JP | 3-274938 | 12/1991 |

* cited by examiner

*Primary Examiner*—Mohammed Ghayour
*Assistant Examiner*—Sophia Vlahos
(74) *Attorney, Agent, or Firm*—Morrison & Foerster LLP

(57) ABSTRACT

The invention provides a method for recovering a digital datastream, in which a reference clock phase is recovered from the digital datastream, the digital datastream being received in a datastream receiver, low-pass filtered in a low-pass filter device, an edge position signal being determined by comparing an amplitude of the low-pass filtered datastream with a predetermined threshold value in an edge position detection device and a phase deviation being determined from a time difference between a 0/1 threshold intersection point of the threshold value with a 0/1 data transition or a −1/1 threshold intersection point of the threshold value with a −1/1 data transmission and the target time of the control system in a phase correction device, so that the phase deviation can be corrected with the phase correction offset in the phase correction device.

11 Claims, 4 Drawing Sheets

METHOD FOR DETERMINING A REFERENCE CLOCK PHASE FROM BAND-LIMITED DIGITAL DATA STREAMS

CLAIM FOR PRIORITY

This is application claims benefit to international application PCT/EP02/05105, filed on May 8, 2002, which claims the benefit of priority to German application 10122621.7, filed May 10, 2001.

TECHNICAL FIELD OF THE INVENTION

The present invention relates to a method for recovering a digital datastream and, in particular, relates to a method for recovering a reference clock phase from the digital datastream.

BACKGROUND OF THE INVENTION

Datastreams are transmitted, for example, as AMI (Alternate Mark Inversion) datastreams. In the AMI data transmission method, two lines are provided without DC component for the transmission of datastreams, the analog signals on one line being inverted with respect to the analog signals on the other line.

In the text which follows, logical signals are signals, the signal level of which changes from one logical state to another logical state and the signals can assume a minimum datastream value, a baseline value or a maximum datastream value. In this arrangement, the minimum datastream value is called a logical "−1", while the value of a baseline is called a logical "0" and the maximum datastream value is a logical "+1". Between all of these signal values, transitions can take place, i.e. there are 0/1 data transitions, 1/0 data transitions, 0/−1 data transitions, 1/0 data transitions which will be called single-step data transitions in the text which follows. Furthermore, there are −1/1 data transitions and 1/−1 data transitions which will be called double-step data transitions in the text which follows.

The information to be transmitted is digitized in such a manner that digital datastreams are provided with a multiplicity of the abovementioned data transitions. The reception and further processing of digital datastreams require that a reference clock signal can be derived directly from the digital datastream.

Conventionally, a clock signal which is derived directly from detector data transitions, for example from a baseline value to a maximum datastream value or to a minimum datastream value or, respectively, a transition from a minimum datastream value to a maximum datastream value or conversely, is provided as the reference clock signal.

In practice, the direct recovery of a reference clock from the datastream is made more difficult by the fact that the received digital datastreams have jitter i.e. are generally noisy and have "AMI code violations" (bipolar violations).

Conventionally, for example, a time at which a datastream crosses a fixed threshold is taken as the time of a 0/1 data transition.

A disadvantage of this conventional method consists in that bit-pattern-dependent distortion must be avoided, with the consequence that the frequency spectrum of the datastream must also contain frequency components above a center frequency of the useful signal.

This leads to the further disadvantage that noise components are also carried and amplified which can corrupt the useful signal and increase the phase jitter.

FIG. 2 shows a conventional method for determining a reference clock RT from a received digital datastream DS. In a datastream receiver E, a digital datastream DS is received and the received signal is supplied to an edge position detection device F which is supplied with a threshold value from a threshold setting device S. This threshold value can be provided as a positive value or as a negative value and the value is preferably between a minimum datastream value and a maximum datastream value. If the received digital datastreams supplied to the edge position detection device F exceeds or drops below this threshold value, a threshold intersection point between, for example, a 0/1 data transition (or another one of the abovementioned data transition) and the set threshold value is output as the reference clock phase RT.

Furthermore, disturbances such as jitter, i.e. in general noise, band limiting due to the transmission channel etc. have a disadvantageous effect on the determination of a reference clock phase RT which, therefore, has large errors in such a conventional method of determination.

In DE 3442613 A1, a synchronizing stage for obtaining a synchronizing signal is disclosed in which a biternary data sequence referred to a zero line can assume four different amplitude values, namely a maximum positive amplitude value, a maximum negative amplitude value, a positive amplitude value and a negative amplitude value. Although it is possible to obtain with the aid of the arrangement of DE 3442613 A1 a synchronizing signal which is independent of effects of jitter, the circuit arrangement disclosed is extremely complex and costly. Thus, to obtain the synchronizing signal, first, second and third threshold values must be in each case allocated to first, second and third threshold switches or comparators, different threshold switches being addressed depending on the detected edge. The method performed by means of the device of DE 3442613 A1 is extremely complex and is not suitable for reliable and, at the same time, simple recovery of a reference clock from a received digital datastream.

SUMMARY OF THE INVENTION

The present invention obtains a reference clock from a received digital datastream in a simple manner and with high accuracy.

In one embodiment of the invention, there is a method for recovering a digital datastream in which a reference clock phase is recovered from the digital datastream, and a device corresponding thereto has the following advantages.

Advantageously, a received digital datastream is low-pass filtered in order to eliminate unwanted noise components.

In one embodiment of the invention, there is a method for recovering a digital datastream in which a reference clock phase is recovered from the digital datastream and an edge position signal obtained is corrected with a phase correction value as determined by a determination of a data transition.

According to a preferred embodiment of the present invention, the threshold value is set in such a manner that it assumes a value between a baseline value (logical "0") and a maximum data value (logical "1").

According to a further preferred embodiment of the present invention, the threshold value is set in such a manner that it assumes a value between the baseline value and a minimum datastream value (logical "−1").

According to yet another preferred embodiment of the present invention, the threshold value will be variably adjustable.

According to yet another preferred embodiment of the present invention, the received digital datastream is low-pass filtered with a variable frequency.

According to yet another preferred embodiment of the present invention, an absolute value of a phase correction value is provided in dependence on a cut-off frequency of the low-pass filtering device and of the data transmission channel.

According to yet another preferred embodiment of the present invention, an absolute value of a phase correction value is provided in dependence on an adjustable threshold value.

According to yet another preferred embodiment of the present invention, an edge slope of a data transition in the digital datastream is calculated.

According to yet a further preferred embodiment, the data transition preceding in each case is used for determining an edge position signal of a last (current) detected data transition.

According to yet another preferred embodiment of the present invention, an arbitrary preceding data transition (n-2, n-3, . . . ) is used, n being the last detected (current) data transition.

According to yet another preferred embodiment, a variable threshold value is used which is derived from a peak amplitude of the datastream by multiplying the peak amplitude of the datastream by a predeterminable factor of less than 1.

BRIEF DESCRIPTION OF THE DRAWINGS

Exemplary embodiments of the invention are shown in the drawings and explained in greater detail in the description following.

In the drawings.

DETAILED DESCRIPTION OF THE INVENTION

Figure 1:
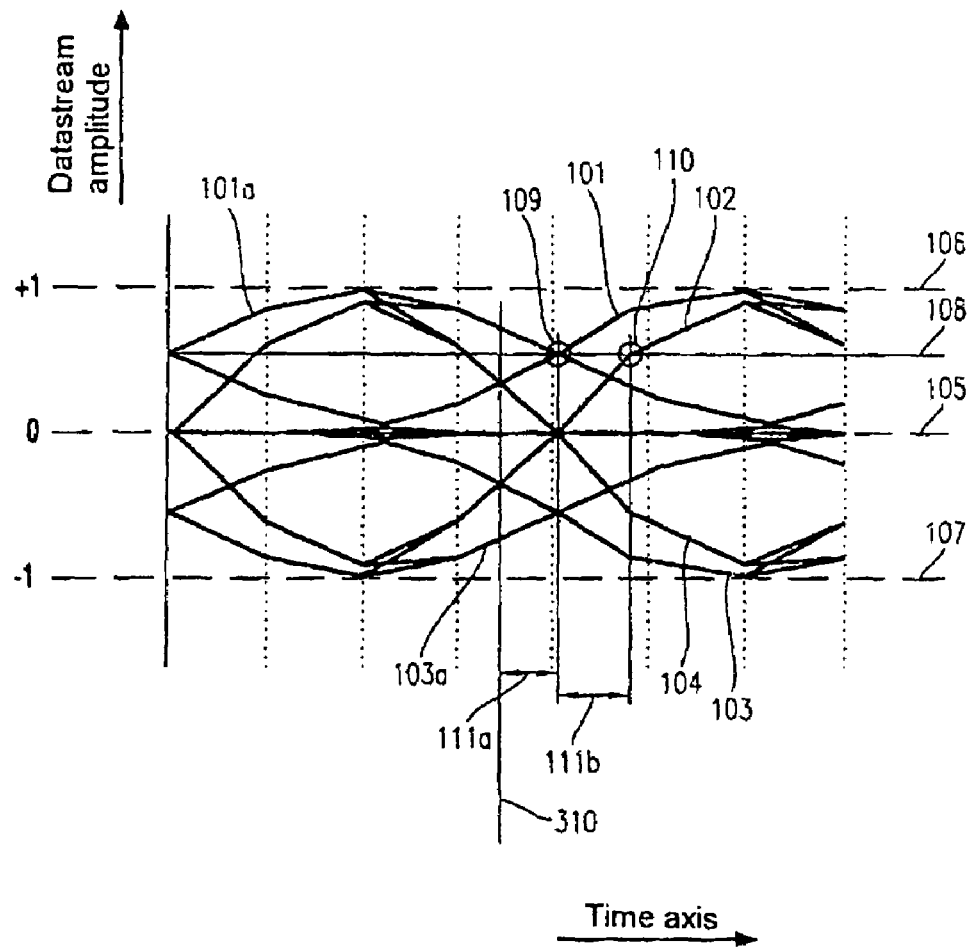
FIG. 1 shows an eye pattern of a band-limited digital datastream with single-step and double-step data transitions.
Figure 2:
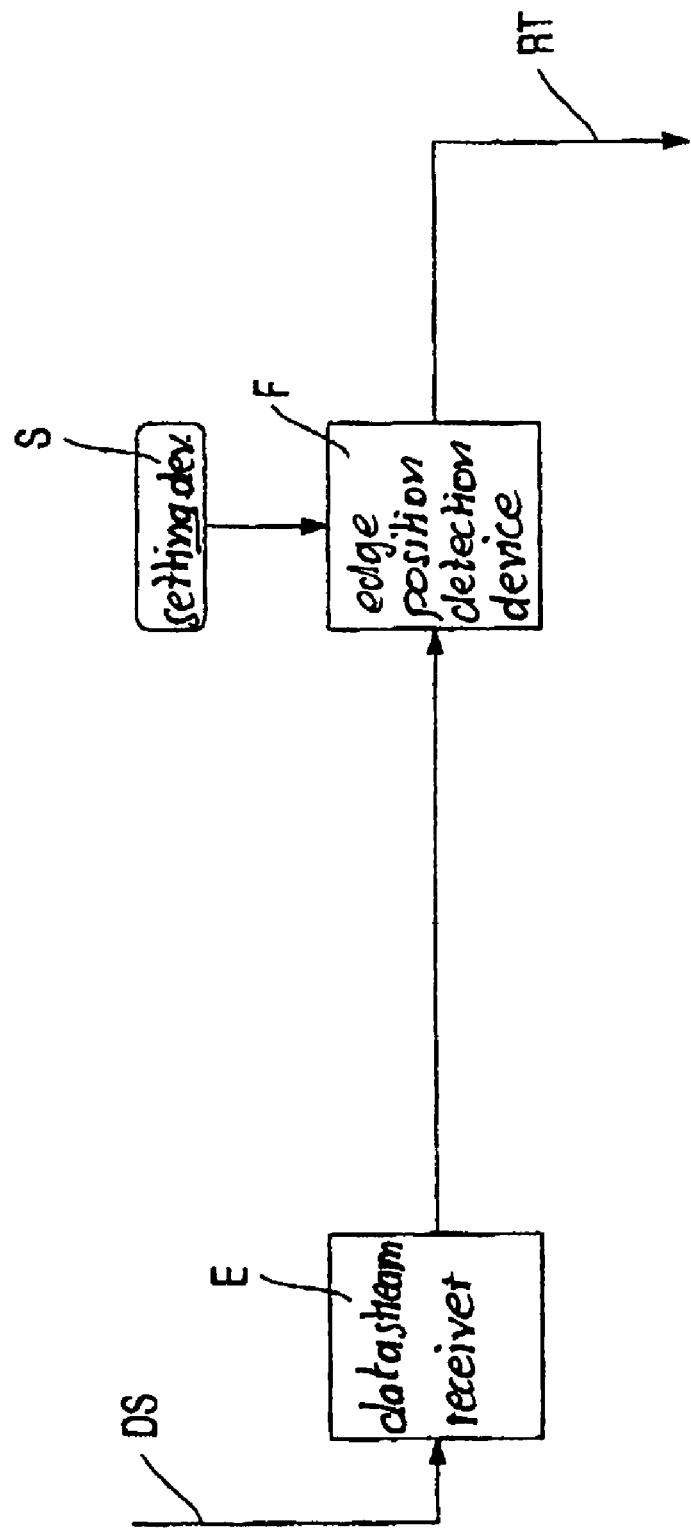
FIG. 2 shows an arrangement for recovering a reference clock phase from a digital datastream according to the prior art.

FIG. 1 shows an eye pattern of a band-limited digital datastream with single-step and double-step data transitions.

In the eye pattern shown in FIG. 1, a digital datastream can be seen and, for example, data transitions are shown which represent a single-step 0/1 data transition 101, a single-step 0/−1 data transition 103, a single-step 1/0 data transition 103a, a single-step 1/0 data transition 101a, a double-step −1/1 data transition 102 and a double-step 1/−1 data transition 104.

The data transitions are represented, for example, as transitions between a baseline value 105 and a maximum datastream value 106 or, respectively, a minimum datastream value 107, or between a minimum datastream value 107 and a maximum datastream value 106. A variably adjustable threshold value 108 provides different intersection points with data transitions and, for example, two intersection points are shown, a 0/1 threshold intersection point 109 as intersection point of a 0/1 data transition 101 with the threshold value 108 and a −1/1 threshold intersection point 110 with the double-step −1/1 data transition 102.

As can be seen from FIG. 1, the edge slope of the −1/1 data transition 102 is greater than the edge slope of the 0/1 data transition 101. The corresponding intersection points, i.e. the 0/1 threshold intersection point 109 and the −1/1 threshold intersection point 110 correspondingly do not coincide but are apart by a phase correction offset 110 on the time axis. The band limiting of the received digital datastream results in the eye pattern shown in FIG. 1, the consequence also being that a distinction must be made between single-step and double-step data transitions in order to avoid errors during the recovery of a reference clock phase signal.

Figure 3:
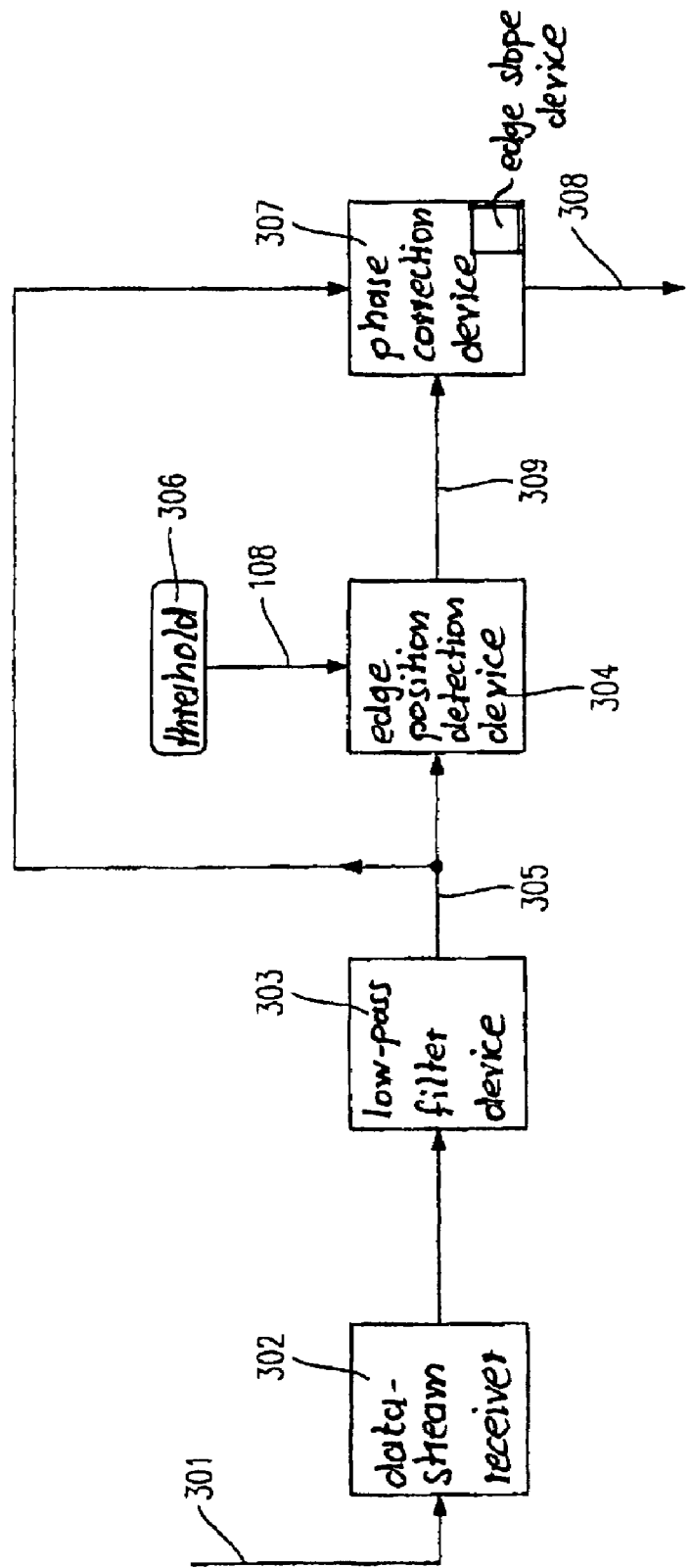
FIG. 3 shows a block diagram of an exemplary embodiment of the method according to the invention for recovering a reference clock phase signal from a digital datastream.

FIG. 3 shows a block diagram of the method according to the invention for recovering a reference clock phase signal from a digital datastream.

In the block diagram shown in FIG. 3, a digital datastream 301 is received by a datastream receiver 302, the output signal of the datastream receiver 302 being supplied to a low-pass filter device 303. In the low-pass filter device 303, low-pass filtering is performed with a predeterminable cut-off frequency, a cut-off frequency being set in such a manner that unwanted noise components and noise are filtered out of the useful signal.

The low-pass-filtered datastream has the characteristics explained with reference to FIG. 1, in particular resulting in the eye pattern which can be seen in a representation. The low-pass-filtered datastream 305 is supplied, on the one hand, to a phase correction device 307 and, on the other hand, to an edge position detection device 304. In the edge position detection device 304, an intersection point of a data transition (single-step or double-step) is compared with a threshold value 108 which can be predetermined by means of a threshold setting device 306 and is supplied to the edge position detection device 304. The result of the comparison is an edge position signal 309 which is also supplied to the phase correction device 307. In the phase correction device 307, a phase correction is performed. The phase correction value 111 is composed of an essentially constant phase correction offset 111b and a variable phase deviation 111a. The phase deviation 111a is the distance between the edge position signal 309 and the target time of the control system 310.

The method for determining the phase correction value 111 are explained below with reference to FIG. 4. As the result of the phase correction in the phase correction device 307, a reference clock phase signal 308 which optimally tracks the received datastream is provided at the output of the phase correction device 307.

Figure 4:
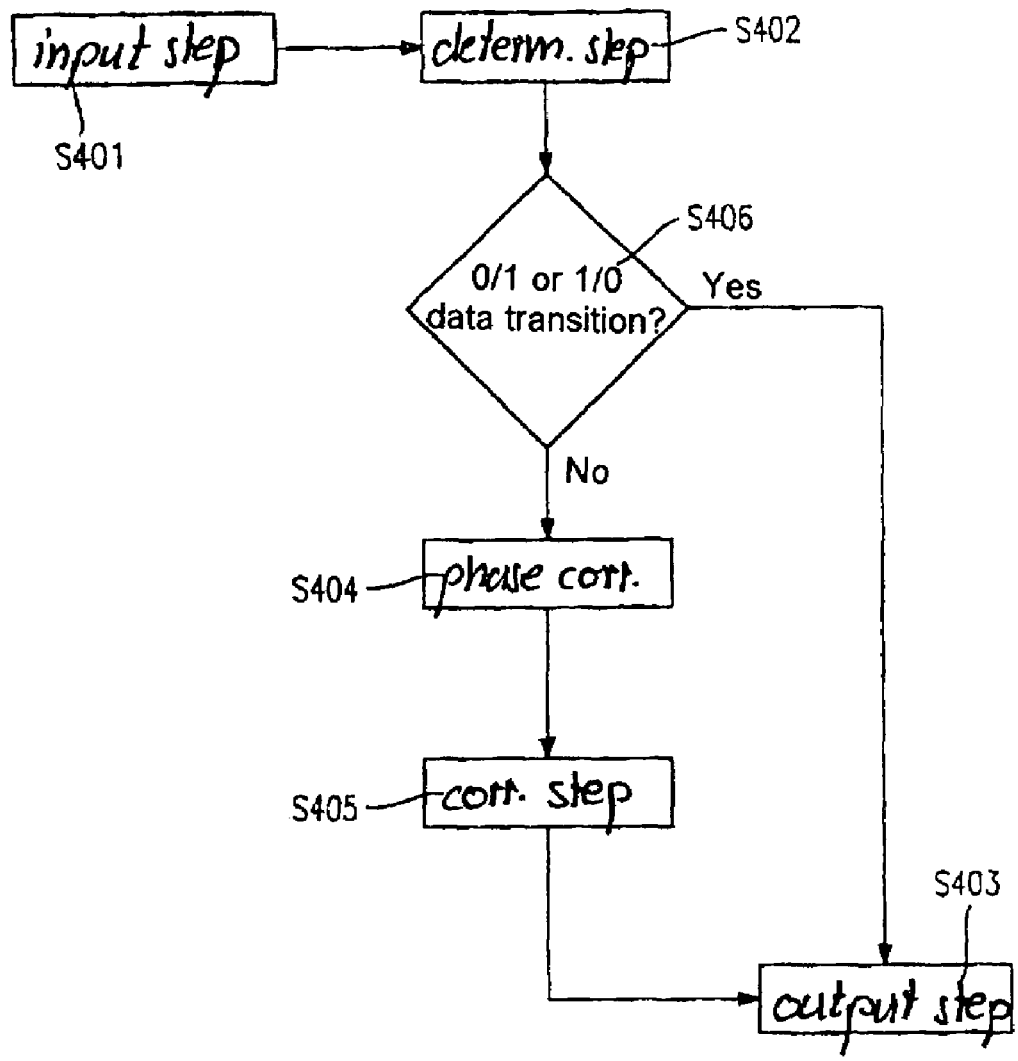
FIG. 4 shows a block diagram which illustrates the steps needed for determining a reference clock phase signal, which are performed in a phase correction device according to an exemplary embodiment of the present invention.

FIG. 4 illustrates a flow chart which shows the method for determining a reference clock phase signal which are performed in a phase correction device 307 according to an exemplary embodiment of the present invention.

The flow chart shown in FIG. 4 explains how the phase correction device 307 determines the phase correction value 111.

To determine the phase deviation 111a, the difference between the edge position signal 309 and the control target value 310 is formed.

The processing then proceeds to a S402 in which the last detected data transition is determined. It shall be assumed that the data transition determined in the preceding step was a 0/1 data transition or a 1/0 data transition, i.e. a single-step data transition. If the last detected data transition is also a 0/1 or 1/0 data transition, the phase deviation 111a is used directly as phase correction value 111 and the processing proceeds to an output S403.

If it is determined that the last detected data transmission is not a 0/1 or 1/0 data transition, the processing proceeds to a phase correction value determining S404 in which a phase correction value 111, determined as above, is taken into consideration in the calculation of the reference clock phase signal in that, in the case of a −1/1 data transition 102, for example, the phase correction offset 111b is added to the phase deviation 111a in a subsequent correction S405. The processing then proceeds to the output S403.

It can be seen clearly that the flow chart shown in FIG. 4 is correspondingly provided if a preceding data transition was a double-step data transition and is compared with a last detected data transition. In this case, the interrogation in interrogating S406 changes to the effect that an interrogation "0/1 or 1/0 data transition?" is replaced by an interrogation "−1/1 or 1/−1 data transition?", i.e. the question is whether there is a double-step data transition present instead of a single-step data transition.

It is also possible to relate the interrogation shown in FIG. 4 to at least one arbitrary past data transition.

Although the present invention has been described above by means of preferred exemplary embodiments, it is not restricted to these but can be modified in many ways.

LIST OF REFERENCE DESIGNATIONS

101 0/1 data transition
101a 1/0 data transition
102 −1/1 data transition
103 0/−1 data transition
103a −1/0 data transition
104 1/−1 data transition
105 baseline value
106 maximum data stream value
107 minimum data stream value
108 threshold value
109 0/1 threshold intersection point
110 −1/1 threshold intersection point
111 phase correction value
111a phase deviation
111b phase correction offset
301 digital datastream
302 datastream receiver
303 low-pass filter device
304 edge position detection device
305 low-pass-filtered datastream
306 threshold setting device
307 phase correction device
308 reference clock phase signal
309 edge position signal
310 target time of the control system
S401 input step
S402 data transition determining step
S403 output step
S404 phase correction value determining step
S405 correction step
S406 interrogation step

What is claimed is:

1. A method for recovering a digital datastream in which a reference clock phase is recovered from the digital datastream, comprising:
   receiving the digital datastream in a datastream receiver;
   low-pass filtering the received digital datastream in a low-pass filter device;
   setting a threshold value in a threshold setting device;
   determining an edge position signal by comparing an amplitude of the low-pass-filtered datastream with the threshold value in an edge position detection device;
   determining a phase correction value from a time difference between a 0/1 threshold intersection point of the threshold value with a 0/1 data transition and a −1/1 threshold intersection point of the threshold value with a −1/1 data transition in a phase correction device;
   correcting the edge position signal with the phase correction value in the phase correction device; and
   outputting a reference clock phase signal from the phase correction device,
   wherein determining and correcting further comprise:
   determining an edge slope of the data transitions in the phase correction device; and
   correlating the data transitions with the edge slope,
   and in each case a preceding data transition is provided for determining the edge position signal of a current data transition and the edge position signal is corrected with the phase correction value in the phase correction device,
   the phase correction value is calculated from a phase deviation and a phase correction offset if a preceding data transition and a current data transition differ, and
   the phase deviation of the preceding data transition is used as the phase correction value if the preceding data transition and the current data transition match.

2. The method for recovering a digital datastream as claimed in claim 1, wherein the threshold value is located between a minimum datastream value and a maximum datastream value.

3. The method for recovering a digital datastream as claimed in claim 1, wherein the phase correction value is provided for positive threshold values which assume a value between a baseline value and a maximum datastream value and for negative threshold values which assume a value between the baseline value and a minimum datastream.

4. The method for recovering a digital datastream as claimed in claim 1, wherein the threshold value is set in such that it assumes a value between a baseline value and a maximum datastream value.

5. The method for recovering a digital datastream as claimed in wherein the threshold value is set such that it assumes a value between a baseline value and a minimum datastream value.

6. The method for recovering a digital datastream as claimed in claim 1, wherein the threshold value is variably adjustable.

7. The method for recovering a digital datastream as claimed in claim 1, wherein the received digital datastream is low-pass-filtered with a cut-off frequency in a low-pass filter device, the cut-off frequency being set in such a manner that unwanted noise components and noise are filtered out of the useful signal.

8. The method for recovering a digital datastream as claimed in claim 1, wherein an absolute value of a phase correction value is provided in dependence on a cut-off frequency of low-pass filter device, on the transmission channel and on the predeterminable threshold value.

9. The method for recovering a digital datastream as claimed in claim 1, wherein an arbitrary preceding data transition, is provided for determining an edge position signal of a last detected data transition.

10. The method for recovering a digital datastream as claimed in claim 1, wherein a variable threshold value is provided which is derived from a peak amplitude of the datastream by multiplying the peak amplitude of the datastream by a predeterminable factor of less than 1.

11. A device for recovering a digital datastream, comprising:
- a datastream receiver detecting the digital datastream;
- a low-pass filter device low-pass filtering the detected digital datastream;
- a threshold setting device setting a threshold value;
- an edge position detection device determining an edge position signal by comparing an amplitude of the low-pass filtered datastream with the threshold value; and
- a phase correction device determining a phase correction value from a time difference between a 0/1 threshold intersection point of the threshold value with a 0/1 data transition and a −1/1 threshold intersection point of the threshold value with a −1/1 data transition and correcting the edge position signal with the phase correction value, wherein the phase correction device includes an edge slope determining device that determines an edge slope of the data transitions, and correlates the data transitions with the determined edge slope, in which in each case a preceding data transition is provided to determine the edge position signal of a current data transition and the edge position signal is corrected with the phase correction value in the phase correction device, in which the phase correction value is calculated from a phase deviation and a phase correction offset if the preceding data transition and the current data transition differ, and the phase deviation of the preceding data transition is used as the phase correction value if the preceding data transition and the current data transition match.

* * * * *